Patented Aug. 24, 1948

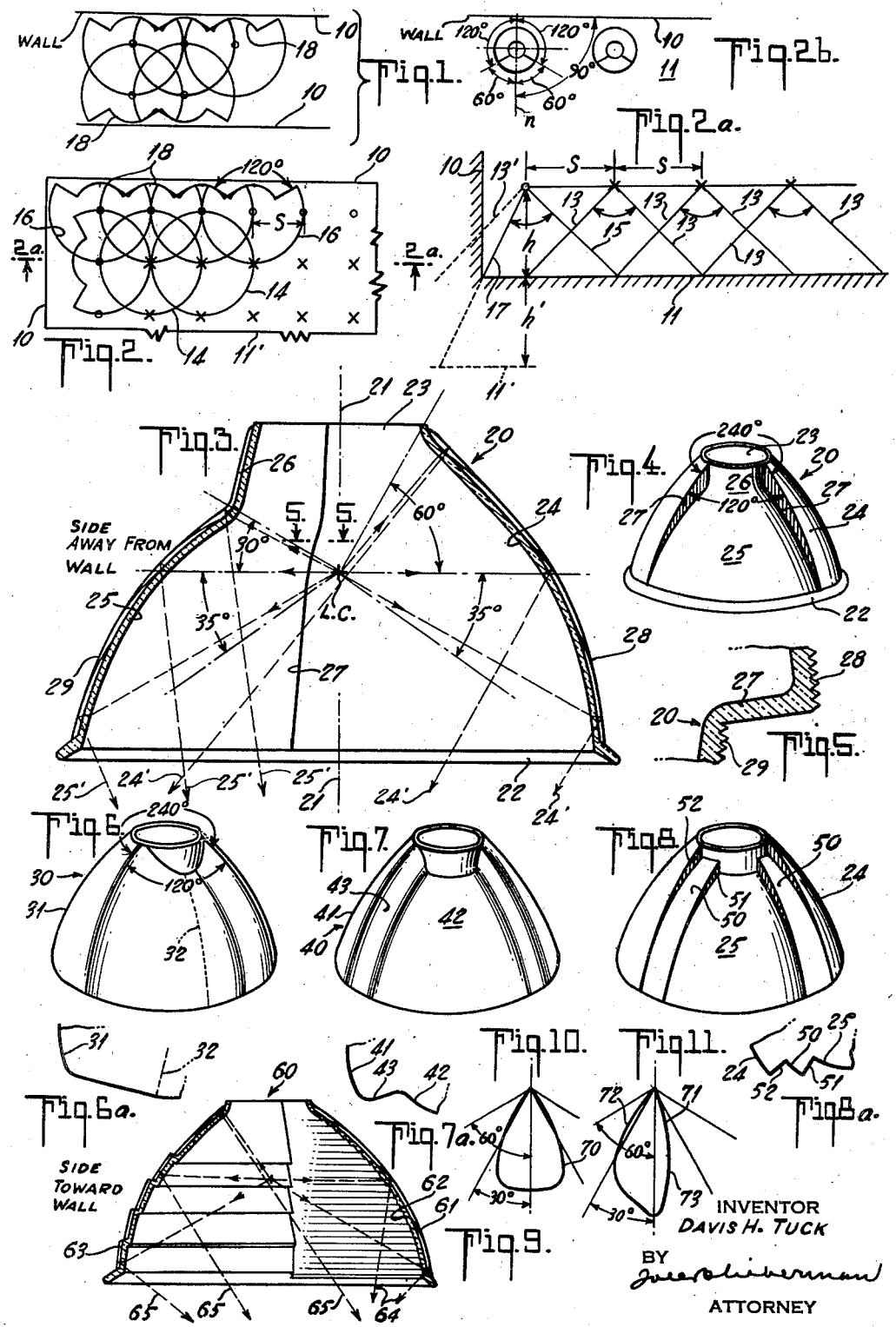

2,447,923

UNITED STATES PATENT OFFICE 2,447,923

LIGHTING SYSTEM AND LIGHTING UNITS FOR USE THEREIN

Davis H. Tuck, Redding Ridge, Conn., assignor to Holophane Company, Inc., New York, N. Y., a corporation of Delaware Application August 26, 1944, Serial No. 551,323

12 Claims. (Cl. 240—9)

The present invention relates to lighting systems and lighting units for use therein.

High bay lighting generally employs a number of direct lighting units mounted at considerable height above the working area. These units generally employ high wattage incandescent or mercury lamps and downwardly acting specular reflectors and the ratio of spacing to mounting height is 1:1 or less, for example ½:1.

In units designed for a spacing to height ratio of 1:1 the radius of the area lighted is approximately the same as the spacing so that vertical surfaces under each unit receive light from adjacent units. A lighting system employing such lighting units has a high utilization factor throughout the entire area covered by the lighting units, except that near the edges of such area, as, for example, near the walls of a building or the margins of a bay, considerable light is spilled on wall surfaces or beyond the working area and lost.

The present invention relates to lighting systems for lighting such areas according to which the light is confined to the working area and not wasted on walls or regions beyond the working area, and to secure this advantage the lighting units employed along the margins of the working area are asymmetric units. These units have the same ratio of spacing to mounting height as the other units, and throughout the entire regions where the wider spread distribution suitable for the 1:1 ratio can be employed these asymmetric units have the same horizontal spread as the symmetric units used elsewhere in the system. On the side of the units away from the wall line or edge of the working area the asymmetric units are provided with a reflector of different profile approximately one adapted for use in high bay lighting units of the type designed for a spacing-mounting height ratio of .5. This altered profile gives a horizontal spread which is approximately half the spread of that of the remainder of the asymmetric unit.

In other cases the bays are so narrow that only two rows of lighting units are required, and in this case all the units are asymmetric. Also a row of asymmetric units would be used for lighting the vertical surfaces of tall machinery along a narrow aisle.

The accompanying drawings illustrate an installation of lighting equipment according to the present invention and several forms of lighting fixture suitable for use in such systems.

In these drawings:

Figure 1 is a diagrammatic plan view showing the lighting of a narrow bay by two rows of asymmetric fixtures only;

Figure 2 is a diagrammatic plan view illustrating the location of symmetric and asymmetric fixtures and the floor pattern of illumination from the fixtures;

Figure 2a is a section on the line 2a—2a of Figure 2 illustrating the relation of the fixtures to the working area in vertical planes and at twice the scale of Figure 2;

Figure 2b is a diagrammatic plan view of a row of asymmetric fixtures;

Figure 3 is a vertical sectional view through a prismatic reflector for an asymmetric unit such as referred to in Figures 1, 2, 2a and 2b;

Figure 4 is a perspective view of the luminaire of Figure 3;

Figure 5 is a fragmentary sectional view on the line 5—5 of Figure 3;

Figures 6 and 6a are perspective and diagrammatic outline sectional views of a form of metallic reflector;

Figures 7 and 7a are views similar to Figures 6 and 6a showing a modified form of metallic reflector;

Figures 8 and 8a are similar views illustrating a modified form of prismatic glass reflector;

Figure 9 is a vertical sectional view through a still further modified form of prismatic glass reflector; and Figures 10 and 11 are photometric curves.

In Figures 1, 2, 2a and 2b wall lines or the like determining the limits of a bay to be lighted are indicated at 10, 10 and the floor of the working area at 11. Adjacent the wall lines 10, 10 of the working area is a row of regularly spaced asymmetric lighting luminaires each indicated by an "o" in these figures. The height $h$ of these units above the floor is the same as the spacing $s$ of the units. Spaced the same distance from the asymmetric units are symmetric units indicated by an "$x$" (Figures 2 and 2a), and these are at the same mounting height as the asymmetric units. In all cases the reflector profiles have vertical axes and are such that reflecting light is caused to cross the axis before it reaches the working plane.

Referring to Figures 1, 2 and 2a it will be seen that the light from the symmetric units $x$ spreads approximately 45° each side of the nadir so that the rays 13, 13 from each symmetric unit strike the floor area approximately under the adjacent sources and light areas within the circles 14, Figure 2. The asymmetric units o (Figures 1, 2 and 2b) are designed to give through approximately 240° (i. e. 120° each side of the normal $n$ to the wall, Figure 2b), the same distribution as that of the symmetric units so that the rays 15 corresponding with the rays 13 strike the working area in arcs 16 extending through about 240°. Throughout the remaining 120° about the vertical axis through the asymmetric units and away from the wall the spread of the light is confined within rays having slopes such as indicated at 17 at the left of Figure 2a and the light within this 120° is confined within a narrower radius arc, such as illustrated at 18, Figures 1 and 2. It will thus be seen that, while the pattern of light thrown down by the symmetric units is circular, the pattern of light thrown down by the asymmetric units is such that very little, if any, of the light reaches beyond the wall line 10. There is therefore a much higher utilization factor of the light for the dominant portion of the light which would have been emitted by a symmetric unit similarly mounted and between the cones represented by the line 17 and the line 13' of Figure 2a is salvaged and placed on the working area rather than being spread on the wall 10 or on more remote areas. In the example given the portion of the asymmetric unit throughout the 120° arc has such profile as would normally be employed where the unit is so mounted at twice the mounting height, i. e., where the floor area was as indicated at 14' in Figure 2.

The above system may employ standard symmetric units at x, and these units are not illustrated in the drawing. The special units required for the asymmetric units are, however, shown and will now be described.

In the construction shown in Figures 3, 4 and 5 the asymmetric unit has a reflector 20 with a vertical axis 21—21, a horizontal circular mouth 22 approximately 35° below the horizontal through the light center L. C. and a horizontal circular top opening 23 approximately 60° above the horizontal. By making the ends of the reflector circular it is possible to carry it in fitters and supports in the same or substantially the same way as the symmetric units. Throughout about 240° about the vertical axis the reflector has a portion 24 generated by rotating an inwardly concave generatrix which is comparatively steep and extends from the mouth to the top of the reflector. Throughout the other 120° the portion 25 is generated by rotating a similar but less steep generatrix. In the region about 30° above the horizontal through the light center, the latter generatrix comes into a radius approximately that of the top opening of the reflector and from there to the top of the reflector is a portion 26 which is nearly cylindrical. The reflector has generally radially extending connecting elements 27, 27 in meridianal planes, these elements extending between portions 24 and 25. The elements 27, 27 and 26 are optically inactive. The portions 24 and 25 are shown as provided with external radial reflecting prisms 28 and 29, but the same profiles could be used with smooth, exteriorly mirrored glass. Reflected rays 24' from the side of the reflector toward the wall pass out of the reflector and cross the vertical axis with angles of the order of 30° to 50° above the nadir, while reflected rays 25' from the side away from the wall pass out of the reflector much more steeply, the angles above the nadir being from about 10° to about 30°.

Figures 6 and 6a indicate a metal reflector form 30 with a contour 31 extending through about 240° which is of the same curvature as the portion 24 of Figure 3. The profile gradually changes from that shown at 31 to a narrower profile in the middle of the 120° arc of Figure 6, so that along the dotted line 32 the profile will be the same as that indicated at 25 in Figure 3. The gradual change in contour in the horizontal plane is indicated in plan in Figure 6a.

Figures 7 and 7a illustrate a metal reflector form 40 generally similar to that of Figure 6, except that the larger diameter portion 41 and the narrower smaller diameter portion 42 are connected together by sweeping curves 43—43 which are preferably as abrupt as can be made in forming the metal. This reflector form will have distributional characteristics similar to those of Figure 3, except for the differences inherent between prismatic or silvered glass and metal reflectors.

The reflector shown in Figures 8 and 8a is similar to that shown in Figure 3, except that there are steps 50, 50 whose profile is intermediate that of 24 and 25 at Figure 3. Instead of abrupt connecting elements such as indicated at 27, 27, Figure 4, we now have two connecting elements 51 and 52. This form may be prismatic, or silvered, or metal.

Figure 9 illustrates the prismatic reflector 60 which has a stepped profile 63 on the side towards the wall, extending more than 180° about the vertical axis and a continuous profile 61 with annular refracting prisms 62 on the inner surface. The externally smooth portion reflects the light more vertically downward than the opposite stepped portion, as indicated by the rays 64 and 65.

Figure 10 illustrates a photometric curve 70 which is typical of the distribution to be obtained from symmetric fixtures with profiles such as indicated at 24. Such distribution curves will be available for all the symmetric units and for the portions of the asymmetric units at the wider profile.

Figure 11 illustrates a photometric curve 71 such as would be had in the same plane as Figure 3 is taken. On the left hand side of the vertical in Figure 11 (the side away from the wall) the portion 72 of the curve portion 71 is the same as one-half of the curve portion 70 while on the right the portion 73 of the curve 71 shows a much narrower distribution of controlled light. Owing to the fact that the bottom openings of the reflectors are annular about the vertical axis through the corresponding sources and of the same diameter, uniform screening angles are had throughout the installation.

Since it is obvious that the invention may be embodied in other forms and constructions within the scope of the claims, I wish it to be understood that the particular forms shown are but a few of these forms, and various modifications and changes being possible, I do not otherwise limit myself in any way with respect thereto.

What is claimed is:

1. Means for lighting the marginal portions of a work area extending along a wall line comprising a row of lighting fixtures parallel with the wall each having a light source and a reflector, each reflector having a portion with a vertical axis and of uniform profile throughout substantially 120° each side of a vertical plane through the axis normal to the wall line and a portion with the same axis and an uniform but more concentrating profile throughout substantially 60° each side of said vertical normal plane, each portion reflecting light across the axis, all the reflectors being oriented with the more concentrating profiles away from the wall line so that the fixtures spread light more from the vertical in regions away from the wall line than regions toward the wall line.

2. In a lighting installation, a plurality of pairs of parallel rows of regularly spaced direct lighting units at an uniform elevation above a working plane, each of the lighting units of the rows other than the outermost row having a source and a reflector which is of uniform, relatively steep profile in all vertical planes to reflect light across the axis and produce a symmetrical distribution with uniform spread away from a vertical axis and uniform screening angle, each of the lighting units of the outermost row having a light source and a reflector, the profiles of the latter reflectors in vertical planes being of the same as the profiles of first mentioned reflectors throughout an angle of substantially more than 180°, and throughout an angle of substantially more than 90° being less steep so as to reflect light across the axis with less spread from the nadir, the latter reflectors having the same screening angle as the first mentioned reflectors and being oriented so that the less steep sides are on the inside of the outermost row, whereby light flux reflected by said less steep profiles and emitted beyond the vertical plane through the outermost row is kept nearer the nadir than the other reflected light.

3. A direct lighting luminaire comprising a light source and a specular reflector having a vertical axis through the source, substantially more than one-half of the reflector being of uniform profile in vertical planes through the axis and reflecting light across the axis to produce reflected light rays of controlled spread throughout more than 180° about said vertical axis, substantially more than 90° of the reflector being of uniform but less steep profile about said axis reflecting light across the axis to produce reflected light rays of controlled but narrower spread throughout more than 90° about said vertical axis.

4. A luminaire as in claim 3, wherein the reflector is circular at both its upper end and at its mouth and having generally radially extending connecting elements between the portions of different profile, the less steep profile portion extending upwardly from the circular mouth closer to the vertical axis than the other portion of the reflector.

5. A luminaire as in claim 3, wherein the reflector is glass with radial reflecting prisms, is circular at both its upper end and at its mouth and has a radially extending optically inactive wall between the portions of different profile.

6. A luminaire as in claim 3, wherein the reflector is glass with radial reflecting prisms, and the profile of the first mentioned portion includes steps with external shoulders.

7. A luminaire as in claim 3, wherein the reflector is metal, is circular at both its upper end and at its mouth and has connecting elements of gradually changing radius between the portions of different profile.

8. A specular reflector with a normally vertical axis and having one surface of revolution of uniform profile in meridian planes and generated by moving a generatrix concave to the axis through more than 180° about said axis, and a second surface of revolution of uniform profile in meridian planes and occupying substantially the remainder of the 360° about the vertical axis and generated by moving a generatrix concave to the axis with the same maximum and minimum radii and of lesser radii at all intermediate points than the corresponding points of the first generatrix to provide circular top and bottom openings, and substantially inactive surfaces interconnecting the surfaces of revolution.

9. A specular downwardly and outwardly diverging reflector adapted to receive a source at a predetermined point along its vertical axis, the reflector having a horizontal circular mouth which is substantially 35° below the horizontal plane through said point and a horizontal circular top opening which is substantially 60° above the said horizontal plane, the active surfaces of the reflector throughout substantially 240° about the vertical axis being generated by rotating an inwardly concave generatrix extending from the mouth to the top opening, the active surfaces of the reflector throughout substantially 120° about the vertical axis being generated by rotating an inwardly concave generatrix extending from the mouth to a point substantially 30° above the horizontal plane and at a radius substantially equal to that of the top opening, an inactive substantially cylindrical surface interconnecting the upper edge of the last mentioned active reflecting surface, and connecting elements between the said active surfaces.

10. A reflector as in claim 9, wherein the reflector is glass and the connecting elements are in radial planes.

11. A reflector as in claim 9, wherein the reflector is metallic and the connecting elements are gradually curved in horizontal planes.

12. A down lighting system for a work area comprising a plurality of regularly spaced down lighting units with symmetric reflectors reflecting light across their vertical axes and providing predetermined symmetrical lighting distributions and uniform screening angles about their vertical axes and distributed in rows over the area except above its marginal regions, the ratio of mounting height to spacing of the units being such that the non-marginal regions are substantially uniformly illuminated, and a row of similarly spaced asymmetric down lighting having asymmetric reflectors reflecting light across their vertical axes and providing the same uniform screening angles, the asymmetric reflectors each having two portions, one of substantially two thirds the angular extent about its vertical axis being of the same profile as that of the symmetric reflectors, the other of substantially one third being more concentrating to produce reflected light more nearly vertical, whereby the outer portion of the marginal area laterally of each unit receives more vertically directed light flux at angles nearer the nadir and spillage of light beyond the marginal area is prevented.

DAVIS H. TUCK.

REFERENCES CITED

The following references are of record in the file of this patent:

UNITED STATES PATENTS

| Number | Name | Date |
| --- | --- | --- |
| 1,189,231 | Benjamin | July 4, 1916 |
| 1,347,268 | Godley | July 20, 1920 |
| 1,515,897 | Walser | Nov. 18, 1924 |
| 1,794,839 | Dorey | Mar. 3, 1931 |
| 2,229,034 | Bergmans et al. | Jan. 21, 1941 |
| 2,261,733 | Pahl | Nov. 4, 1941 |
| 2,343,822 | Tuck | Mar. 7, 1944 |

FOREIGN PATENTS

| Number | Country | Date |
| --- | --- | --- |
| 210,303 | Great Britain | Jan. 31, 1924 |
| 249,046 | Great Britain | 1926 |
| 511,783 | Great Britain | 1939 |
| 552,582 | Germany | 1932 |
| 572,815 | Germany | 1933 |
| 693,583 | France | Sept. 1, 1930 |